March 29, 1927.
B. S. AIKMAN
1,622,480
ELECTROHYDRAULIC BRAKE
Filed April 25, 1925
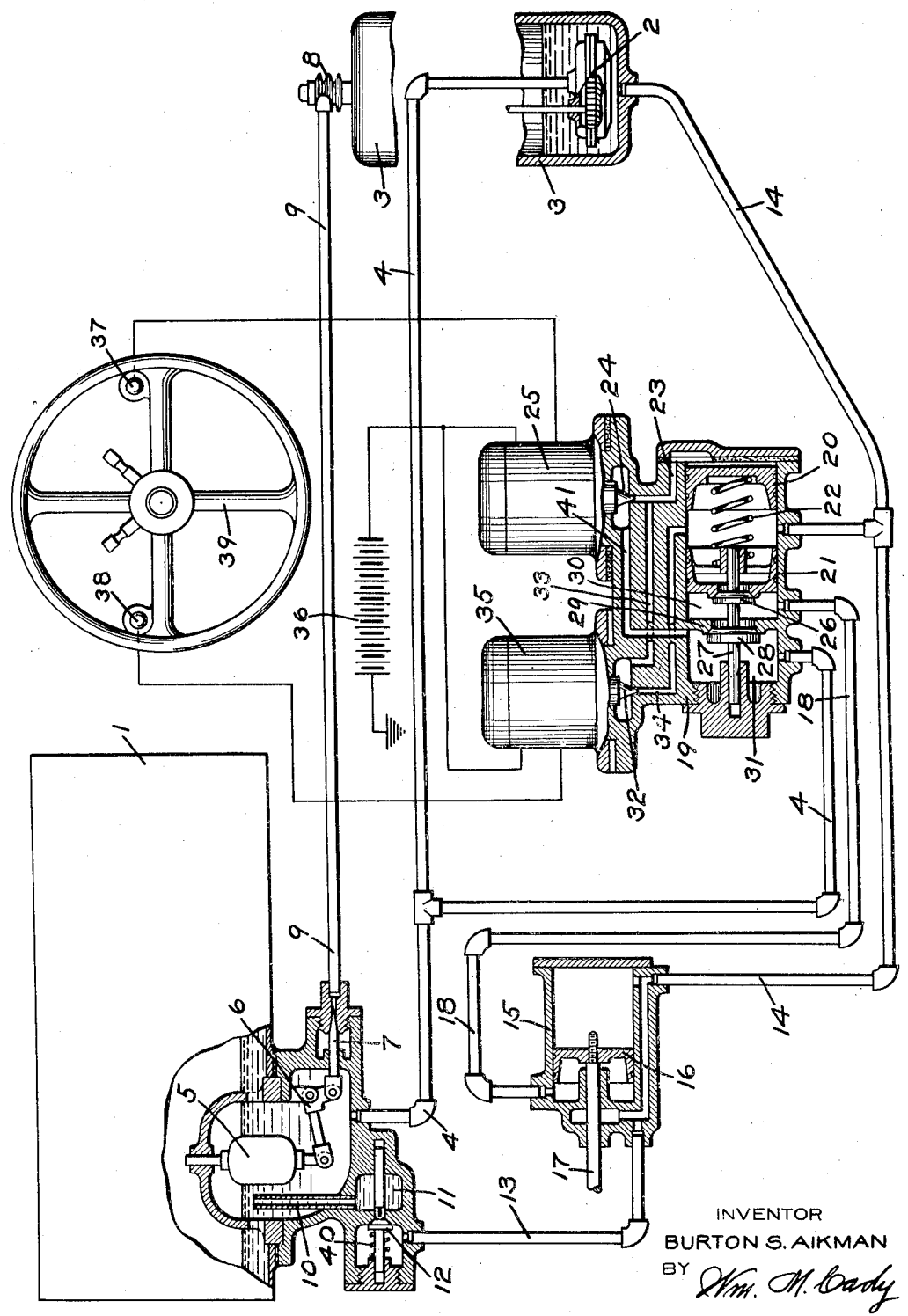
INVENTOR
BURTON S. AIKMAN
BY Wm. M. Cady
ATTORNEY Patented Mar. 29, 1927.

1,622,480

UNITED STATES PATENT OFFICE.

BURTON S. AIKMAN, OF MILWAUKEE, WISCONSIN, ASSIGNOR TO THE WESTINGHOUSE AIR BRAKE COMPANY, OF WILMERDING, PENNSYLVANIA, A CORPORATION OF PENNSYLVANIA.

ELECTROHYDRAULIC BRAKE.

Application filed April 25, 1925. Serial No. 25,790.

This invention relates to brakes, and more particularly to an electrically controlled liquid or hydraulic brake for motor vehicles.

In the construction disclosed in my prior application, Serial No. 18,707, filed March 27, 1925, I employ a reservoir containing liquid which is used to apply the brakes and the body of liquid in the reservoir is maintained under pressure by means of fluid under pressure supplied to the reservoir.

According to one feature of my invention I utilize the gases under pressure developed in the combustion chamber of the vehicle internal combustion engine for maintaining the fluid pressure in the liquid storage reservoir.

Another object of my invention is to provide a hydraulic vehicle brake having an electrically operated controlling means.

Other objects and advantages will appear in the following more detailed description of the invention.

In the accompanying drawing, the single figure is a diagrammatic view, partly in section, of an electro-hydraulic brake equipment embodying my invention.

The equipment shown in the drawing comprises a reservoir 1 which contains the liquid employed in operating the brakes and the level of liquid in the reservoir may be maintained by the usual lubricating system pump 2 of the vehicle internal combustion engine 3, the pump outlet being connected to the reservoir through a pipe 4.

Suitably mounted for vertical movement in the reservoir is a float 5 to which is connected one arm of a bell crank lever 6, the other arm being connected to a valve 7. The valve 7 controls the admission of compressed gases from one of the combustion chambers of the vehicle engine to the reservoir 1, the combustion chamber being connected through a check valve device or accumulator 8 and a pipe 9 to said valve.

Vertically disposed in the reservoir 1 is a stand pipe 10, which opens at its lower end into a chamber 11 and a relief valve 12 controls communication from chamber 11 to a pipe 13 which may be connected to a return pipe 14, leading to the oil pan of the engine 3.

One or more brake cylinders 15 may be employed, which may be of the pull type, having a piston 16 connected to a piston rod 17 through which force is transmitted for applying the brakes. The chamber at the forward side of the piston 16 is connected through a pipe 18 to a controlling valve device 19 and the chamber at the other side of the piston is connected to the return pipe 14.

The brake controlling valve device 19 may comprise a casing having a cylinder containing a floating piston 20 and a floating piston 21, a spring 22 being interposed between said pistons. The chamber at the outer face of piston 20 is connected to a passage 23, controlled by a valve 24, the operation of which is controlled by an electromagnet 25.

Adapted to seat in the piston 21 is an exhaust valve 26 and the valve stem 27 carrying the valve 26 also carries a supply valve 28 which seats in a partition wall 29. Chamber 30 containing the exhaust valve 26 is connected to the brake cylinder pipe 18 and chamber 31 containing the supply valve 28 is connected to supply pipe 4.

For controlling the release of the brakes, a valve 32 is provided, which controls communication from a passage 33 connected with passage 23, to a passage 34, which opens to the chamber intermediate the pistons 20 and 21, said chamber being connected to the return pipe 14. The valve 32 is operated by an electro-magnet 35 and one terminal of each of the magnets 25 and 35 is connected to a source of current 36. The energization and deenergization of the magnets 25 and 35 may be manually effected in any desired way, but in the drawing I have shown for this purpose, push buttons 37 and 38 associated with the usual steering wheel 39 of the motor vehicle.

In operation, when the vehicle engine 3 is running, the oil pump 2 operates to supply oil under pressure through pipe 4 to the reservoir 1. When the oil level in the reservoir has been raised sufficiently, the float 5 will be lifted, so as to open the valve 7, and then gases under pressure will be supplied from the combustion chamber of the engine, through pipe 9 to the reservoir 1.

The space above the oil in the reservoir 1 is thus charged with fluid under pressure until the pressure has increased to a degree sufficient to overcome the resistance of the spring 40 acting on the relief valve 12. For example, the valve 12 may be set to open when the pressure in the reservoir exceeds 100 pounds. When the predetermined pressure is exceeded, the liquid in the reservoir will be forced out through the stand pipe 10 and past the valve 12 to the pipe 13 and thence is returned through the return pipe 14 to the oil pan of the engine 3.

When the oil level in the tank 1 is lowered sufficiently by the flow through the stand pipe 10, the float 5 will be operated to close the valve 7 and thus prevent the further flow of compressed gases to the reservoir.

If the valve 7 should fail to seat for any reason, leakage past the valve 7 to the reservoir 1 will be vented out through the stand pipe 10, after the level of liquid in the reservoir 1 has fallen to the level of the top of the stand pipe 10, so that the level of liquid in the reservoir will be maintained, and at the same time, the pressure in the reservoir will be prevented from exceeding the pressure at which the relief valve 12 is adjusted to open.

If it is desired to apply the brakes, the push button 37 is pressed, so as to close the circuit of the magnet 25. The energization of magnet 25 operates to open the valve 24, permitting liquid under pressure to flow from pipe 4 and chamber 31, through passage 41 and past the valve 24 to passage 23, and thence to the outer face of piston 20.

The piston 20 is then moved toward the left so as to compress the spring 22. The pressure of the spring 22 then acts on piston 21 and moves same toward the left, thereby causing the supply valve 28 to be unseated, while the exhaust valve 26 is held seated. The unseating of valve 28, permits flow of liquid under pressure from chamber 31 to pipe 18 and thence to the brake cylinder 15, so that the brake cylinder piston 16 is operated to effect an application of the brakes. The pressure of liquid supplied to the brake cylinders acts in chamber 30 on the piston 21 and when said pressure has been increased to a degree slightly exceeding the pressure of spring 22, the piston 21 will be shifted to the right until the valve 28 has moved to its seat, cutting off the further flow of liquid to the brake cylinder.

The pressure at which the spring 22 is compressed depends upon the pressure of liquid admitted to the piston 20, which in turn depends upon the time the valve 24 is allowed to remain open.

To release the brakes, the push button 38 is pressed, so as to close the circuit of the magnet 35. The energization of magnet 35 operates to open the valve 32, so that liquid acting on the right side of piston 20 is vented through passage 33 to passage 34 and the chamber intermediate the pistons 20 and 21. From said chamber, the liquid flows through the return pipe 14 to the oil pan of the vehicle engine 3.

The liquid pressure on piston 20 being reduced, the piston moves toward the right, relieving the pressure of spring 22, so that brake cylinder pressure, acting in chamber 30, causes a movement of piston 21 to the right. The valve 28 being held to its seat, the piston 21 will move away from the exhaust valve 26, so that communication is opened from chamber 30 to the chamber intermediate the pistons 20 and 21. Liquid under pressure is thereupon exhausted from the brake cylinder 15 and the brakes are thereby released.

As in my prior application, hereinbefore referred to, means may be provided in connection with the oil pump 2, for limiting the pressure of liquid supplied to the reservoir 1 to a predetermined degree, but as the same forms no part of my present invention, I have not considered it necessary to illustrate such means in the drawing.

Having now described my invention, what I claim as new and desire to secure by Letters Patent, is:—

1. In a liquid pressure brake, the combination with a receptacle containing liquid under pressure and means for supplying liquid from said receptacle for controlling the brakes, of an internal combustion engine having a compression chamber, and means for supplying gases under pressure from said chamber to said receptacle.

2. In a liquid pressure brake, the combination with a receptacle containing liquid under pressure and means for supplying liquid from said receptacle for controlling the brakes, of an internal combustion engine having a compression chamber, a valve for controlling the admission of gases under pressure from said chamber to said receptacle, and a float controlled by the level of liquid in said receptacle for operating said valve.

3. In a liquid pressure brake, the combination with a receptacle containing liquid under pressure and means for supplying liquid from said receptacle for controlling the brakes, of an internal combustion engine having a compression chamber connected to said receptacle, a valve for controlling communication from said chamber to said receptacle, and means controlled by the level of liquid in said receptacle for operating said valve.

4. In a liquid pressure brake, the combination with a receptacle containing liquid under pressure and means for supplying fluid from said receptacle for controlling the brakes, of an internal combustion engine having a compression chamber connected to said receptacle, a valve for controlling communication from said chamber to said receptacle, and means operated upon a predetermined rise in the level of liquid in said receptacle for opening said valve.

5. In a liquid pressure brake, the combination with a receptacle containing liquid under pressure and means for supplying liquid from said receptacle for controlling the brakes, of an internal combustion engine having a combustion chamber, means for supplying gases under pressure to said receptacle, and means for limiting the pressure in said receptacle to a predetermined degree.

6. In a liquid pressure brake, the combination with a receptacle containing liquid under pressure and means for supplying liquid from said receptacle for controlling the brakes, of means for supplying fluid under pressure to said receptacle, the pressure of fluid so supplied constantly acting on said liquid, and means for limiting the pressure in said receptacle to a predetermined degree.

7. In a liquid pressure brake, the combination with a receptacle containing liquid under pressure and means for supplying liquid from said receptacle for controlling the brakes, of means for supplying fluid under pressure to said receptacle, to constantly subject said liquid to the pressure of fluid so supplied, and an excess pressure valve for relieving said receptacle of pressure in excess of a predetermined degree.

8. In a liquid pressure brake, the combination with a receptacle containing liquid under pressure and means for supplying liquid from said receptacle for controlling the brakes, of means for supplying fluid under pressure to said receptacle, a stand pipe extending to a predetermined level of liquid in said receptacle, and an excess pressure valve for relieving the pressure in said receptacle through said stand pipe in excess of a predetermined degree.

9. In a liquid pressure brake, the combination with a valve device operated by variations in liquid under pressure for controlling the application and release of the brakes, of an electrically operated valve for controlling the supply of liquid under pressure to said valve device, and an electrically operated valve for controlling the release of liquid from said valve device.

10. In a liquid pressure brake, the combination with a valve device operated by variations in liquid under pressure for controlling the application and release of the brakes, of electrically controlled means for controlling the liquid pressure in said valve device and push buttons associated with the steering wheel of a motor vehicle for controlling the circuits of said means.

In testimony whereof I have hereunto set my hand.

BURTON S. AIKMAN.